(12) United States Patent
Crenshaw et al.

(10) Patent No.: US 11,442,848 B1
(45) Date of Patent: Sep. 13, 2022

(54) SYSTEM AND METHOD FOR AUTOMATED PATCH COMPATIBILITY OF APPLICATIONS

(71) Applicant: Appceler8, LLC, Oklahoma City, OK (US)

(72) Inventors: Quinton Crenshaw, Oklahoma City, OK (US); Mark Assante, Edmond, OK (US); Robert Peterson, Tulsa, OK (US)

(73) Assignee: Appceler8, LLC, Oklahoma City, OK (US)

( * ) Notice: Subject to any disclaimer, the term of this patent is extended or adjusted under 35 U.S.C. 154(b) by 0 days.

(21) Appl. No.: 17/351,968

(22) Filed: Jun. 18, 2021

Related U.S. Application Data (60) Provisional application No. 63/040,679, filed on Jun. 18, 2020.

(51) Int. Cl.
| | |
|---|---|
| G06F 9/44 | (2018.01) |
| G06F 11/36 | (2006.01) |
| G06F 9/455 | (2018.01) |
| G06F 11/30 | (2006.01) |
| G06F 11/34 | (2006.01) |
| G06F 8/61 | (2018.01) |

(52) U.S. Cl.
CPC .......... *G06F 11/3688* (2013.01); *G06F 8/63* (2013.01); *G06F 9/45558* (2013.01); *G06F 11/302* (2013.01); *G06F 11/3495* (2013.01); *G06F 11/3664* (2013.01); *G06F 11/3684* (2013.01); *G06F 11/3692* (2013.01); *G06F 2009/45562* (2013.01)

(58) Field of Classification Search
CPC .... G06F 11/3688; G06F 8/63; G06F 9/45558; G06F 11/302; G06F 11/3495; G06F 11/3664; G06F 11/3684; G06F 11/3692
See application file for complete search history.

(56) References Cited

U.S. PATENT DOCUMENTS

| | | |
|---|---|---|
| 6,006,034 A | 12/1999 | Heath et al. |
| 6,161,218 A | 12/2000 | Taylor |
| (Continued) | | |

FOREIGN PATENT DOCUMENTS

WO  2020030930 A1  2/2020

*Primary Examiner* — Hang Pan
(74) *Attorney, Agent, or Firm* — McAfee & Taft, A Professional Corportation (57) ABSTRACT

Automated patch compatibility testing systems, methods, and computer program products are disclosed. The automated compatibility testing systems, methods, and computer program products disclosed herein enable an entity to check the functionality of applications following patches applied to an original image so that the enterprise can determine how its target computing systems will react to such patches before those patches are actually installed/deployed to the target computing systems. The automated compatibility testing systems, methods, and computer program products disclosed herein helps enterprises ensure that patches do not adversely impact the target computing systems and the operations thereof, and enable the enterprise to operate with minimal disruptions, stay current with patches, and take proactive and informed business decisions in managing the enterprise's computer infrastructure.

27 Claims, 2 Drawing Sheets

(56) References Cited

U.S. PATENT DOCUMENTS

| | | | |
|---|---|---|---|
| 6,199,204 B1 | 3/2001 | Donohue | |
| 6,434,744 B1 | 8/2002 | Chamberlain et al. | |
| 7,594,219 B2 | 9/2009 | Ramachandran et al. | |
| 7,937,697 B2 | 5/2011 | Alberti et al. | |
| 8,156,487 B2 | 4/2012 | Blumfield et al. | |
| 9,032,382 B1 | 5/2015 | Feeser | |
| 9,092,301 B2 | 7/2015 | Blumfield et al. | |
| 9,146,839 B2 | 9/2015 | Chen et al. | |
| 9,916,227 B2 | 3/2018 | Lachambre et al. | |
| 10,198,255 B2 | 2/2019 | Higginson et al. | |
| 10,372,435 B2 | 8/2019 | Assuncao et al. | |
| 10,514,904 B2 | 12/2019 | Saraswati et al. | |
| 10,970,064 B1 | 4/2021 | Anand et al. | |
| 2007/0198525 A1* | 8/2007 | Chatterjee | G06F 21/572 |
| 2009/0259999 A1 | 10/2009 | Srinivasan | |
| 2010/0094592 A1* | 4/2010 | Cherkasova | G06F 11/3466 |
| | | | 702/182 |
| 2010/0262970 A1* | 10/2010 | Havemose | G06F 9/461 |
| | | | 718/104 |
| 2013/0036328 A1* | 2/2013 | Mutisya | G06F 8/65 |
| | | | 717/172 |
| 2013/0232247 A1* | 9/2013 | Lazar | G06F 11/3409 |
| | | | 709/222 |
| 2014/0344786 A1* | 11/2014 | Adamson | G06F 11/3664 |
| | | | 717/124 |
| 2014/0359213 A1* | 12/2014 | Messec | G06F 3/0665 |
| | | | 711/114 |
| 2015/0089479 A1* | 3/2015 | Chen | G06F 11/3664 |
| | | | 717/124 |
| 2015/0347286 A1* | 12/2015 | Kruglick | H04L 43/50 |
| | | | 714/38.1 |
| 2015/0378716 A1* | 12/2015 | Singh | H04W 4/60 |
| | | | 717/172 |
| 2017/0206155 A1* | 7/2017 | Ren | G06F 11/3688 |

\* cited by examiner

SYSTEM AND METHOD FOR AUTOMATED PATCH COMPATIBILITY OF APPLICATIONS

CROSS-REFERENCE TO RELATED APPLICATIONS

This application is a non-provisional of and claims the benefit of U.S. provisional application No. 63/040,679, filed on Jun. 18, 2020, the entire contents of which are hereby incorporated by reference.

BACKGROUND

The present disclosure relates generally to the field of testing patch compatibility on computer systems, and more specifically to computer program products, methods, and systems for automated testing of patches and patch compatibility of a target computing system.

Management and maintenance of information technology (IT) systems can be a significant concern for most modern enterprises. Software vendors frequently provide updates or patches (as used herein and throughout this disclosure, collectively "patches") to address security vulnerabilities, fix performance bugs or other problems, provide enhanced security features, or otherwise improve a computer application, program, and/or operating system. However, not all patches will be compatible with an enterprise's existing computer systems, both hardware and software, and may adversely impact the computer systems, including the performance of the hardware used and/or the software applications installed thereon.

Currently, there is not a standardized process of vetting hardware and application compatibility with specific operating systems or images of an enterprise's computer systems. Although there are various patch management software options, such options do not test how new patches will affect a target computing system. Likewise, there is compatibility testing software, but it does not automatically download and test new patches. Accordingly, enterprises desiring to perform compatibility testing of patches typically accomplish such testing manually.

Manual compatibility testing can be a lengthy, expensive, and high time and labor resource consuming process. For example, an enterprise manually vetting application compatibility following the release of a patch generally begins with creation of an image of the target computing system, e.g. the system to be patched, and then adding application upon application until either there is a failure, or all applications install successfully. In such scenarios, enterprises may avoid patching altogether due to the risk of failure and/or lack of resources, e.g., time, manpower, tools, etc., to test compatibility, or the enterprise may install patches and simply hope for the best. The consequences of having incompatible patches can adversely affect an enterprise's bottom line as an incompatible patch can cause a major business interruption that can impact the day-to-day functioning of the enterprise, including its workforce and revenue stream, and cause the enterprise to expend significant time, money, and labor resources to remedy the problem caused by an incompatible patch.

Current patch compatibility testing techniques, methods, systems, and program products do not provide enterprises with business intelligence performance data to provide certain insights to the enterprise to enable the enterprise to make more informed and cost-effective business decisions, maximize utilization of its computing resources and infrastructure, and proactively plan for computer systems upgrades or purchases.

SUMMARY

A method implemented by an automated patch compatibility testing system that includes a memory and a processor, the method comprising: creating, in a hypervisor, a testing image of a target computing system from an original image, wherein the step of creating a testing image from an original image includes installing one or more patches on the original image and thereby creating the testing image. The method further includes for each application in an application list, testing compatibility of the one or more patches with an application on the testing image, wherein the testing compatibility step includes: creating a differencing disk on the testing image, installing one application from the application list on the differencing disk, conducting a performance functionality test of the installed application to obtain performance data, storing the performance data in a database associated with the target computing system, and upon completion of the performance functionality test, destroying the differencing disk, wherein destruction of the differencing disk mitigates against the installed application interfering with subsequent performance functionality tests of different installed applications on the testing image. The method includes generating a test results report upon completion of the testing compatibility step for all applications in the application list, wherein the test results report provides an indication of compatibility of each tested application with the testing image, wherein the indication of compatibility is determined by whether the performance data meets compatibility thresholds, wherein compatibility thresholds are predefined and configurable in the automated patch compatibility testing system, wherein the test results report includes a comparison of performance data from one or more prior compatibility test results to current results from the compatibility test step and provide an indication of changes in performance of the target computing system before and after installation of patches on the original image.

An automated patch compatibility testing system comprising one or more processors, one or more memories coupled to at least one of the processors, and a set of computer program instructions stored in at least one of the memories and executable by at least one of the processors to cause the automated patch compatibility testing system to perform actions of: creating, in a hypervisor, a testing image of a target computing system from an original image, wherein the one or more patches are installed on the original image to create the testing image. For each application in an application list, testing compatibility of the one or more patches with an application on the testing image, wherein the application list corresponds to applications installed on the target computing system to be tested for compatibility with patches applied to the testing image of the target computing system. Testing compatibility includes: creating a differencing disk on the testing image, installing one application from the application list on the differencing disk, conducting a performance functionality test of the installed application to obtain performance data, storing the performance data in a database associated with the target computing system, and upon completion of the performance functionality test, destroying the differencing disk, wherein destruction of the differencing disk mitigates against the installed application interfering with subsequent performance functionality tests of different installed applications on the testing image. The set of computer program instructions stored in at least one of the memories and executable by at least one of the processors further cause the automated patch compatibility testing system to perform action of upon completion of testing compatibility for all applications in the application list, generating a test results report, wherein the test results report provides an indication of compatibility of each tested application with the testing image. Wherein the indication of compatibility is determined by whether the performance data meets compatibility thresholds, wherein compatibility thresholds are predefined and configurable in the automated patch compatibility testing system, wherein the test results report includes a comparison of performance data from one or more prior compatibility test results to current results from the compatibility test step and provide an indication of changes in performance of the target computing system before and after installation of patches on the original image.

A computer program product stored in a computer readable storage medium, comprising program code that, when executed by an automated patch compatibility testing system, causes the automated patch compatibility testing system to perform actions comprising: creating, in a hypervisor, a testing image of a target computing system from an original image, wherein the one or more patches are installed on the original image to create the testing image. For each application in an application list, testing compatibility of the one or more patches with an application on the testing image, wherein the application list corresponds to applications installed on the target computing system to be tested for compatibility with patches applied to the testing image of the target computing system and wherein testing compatibility includes: creating a differencing disk on the testing image, installing one application from the application list on the differencing disk, conducting a performance functionality test of the installed application to obtain performance data, and storing the performance data in a database associated with the target computing system. Upon completion of the performance functionality test, destroying the differencing disk, wherein destruction of the differencing disk mitigates against the installed application interfering with subsequent performance functionality tests of different installed applications on the testing image. The computer program product stored in a computer readable storage medium, comprising program code that, when executed by an automated patch compatibility testing system, further causes the automated patch compatibility testing system to perform action of upon completion of testing compatibility for all applications in the application list, generating a test results report, wherein the test results report provides an indication of compatibility of each tested application with the testing image. Wherein the indication of compatibility is determined by whether the performance data meets compatibility thresholds, wherein compatibility thresholds are predefined and configurable in the automated patch compatibility testing system. Wherein the test results report includes a comparison of performance data from one or more prior compatibility test results to current results from the compatibility test step and provide an indication of changes in performance of the target computing system before and after installation of patches on the original image.

BRIEF DESCRIPTION OF THE DRAWINGS

The drawings included with this application illustrate certain aspects of the embodiments described herein. However, the drawings should not be viewed as exclusive embodiments or limiting. The subject matter disclosed is capable of modification or alteration in form and function, as will occur to those skilled in the art with the benefit of this disclosure.

DETAILED DESCRIPTION

Figure 1:
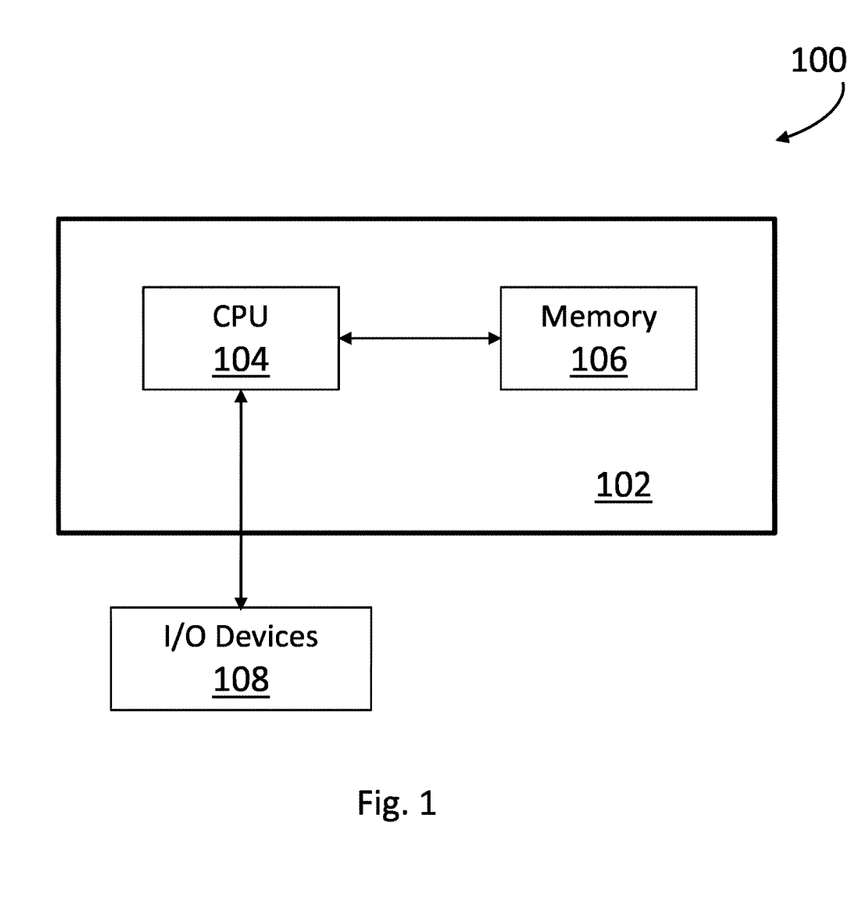
FIG. 1 is a simplified block diagram that shows an example of a computing system for implementing embodiments and features consistent with the present disclosure.

FIG. 1 is an example simplified block diagram for a computing system 100 suitable for implementing and performing the methods, techniques, processes, and executing the computer program products, instructions, and/or components described herein. Computing system 100 includes computing device 102 operably connected to one or more input/output (I/O) devices 108. Computing device 102 is representative of various forms of computing devices, including, without limitation, desktops, laptops, workstations, servers, mobile or portable devices, such as personal digital assistants, tablets, smart-phones, cellular telephones, and other computing devices, and may be utilized to execute the various software components presented herein.

Computing device 102 includes central processing unit (CPU) 104. CPU 104 includes one or more processors reading and/or executing instructions, programs, or applications stored therein or stored in memory 106 and/or computer readable storage media of I/O devices 108, and accessing and/or storing data in memory 106 and/or computer readable storage media of I/O devices 108. CPU is operably connected with memory 106. CPU 104 is also operably connected with I/O devices 108 through an applicable interface component for the corresponding I/O device 108, e.g. port (serial, parallel USB), wire, card (sound, video, network), or the like. Exemplary types of CPU 104 may include general purpose processors, digital programmable devices, microcontrollers, digital signal processors (DSPs), application specific integrated circuit (ASIC), and field programmable gate array (FPGA), or other components and combinations thereof designed to perform the functions described herein. Memory 106 includes data storage, volatile memory, e.g. random access memory (RAM), and non-volatile memory, e.g. read only memory (ROM) or non-volatile RAM (NVRAM).

Computing system 100 or computing device 102 may operate in a networked environment using connections to remote computing devices and computing systems through a network 206, such as a local area network (LAN), wide area network (WAN), peer-to-peer networks, grid computing infrastructures, the Internet, and other network types known in the art. I/O devices 108 include various devices that a user may use to interact with computing system 100 or computing device 102. Representative I/O devices 108 include keyboards, touchscreens, mouse and other pointing devices; a visual display device, such as a cathode ray tube, liquid crystal display, screens, touch screens, and other suitable display devices for visually communicating and interacting with the user; audio devices, such as a microphone, headphones, speakers; and print devices for printing, scanning, faxing, and/or transmitting data and images. I/O devices 108 may also include computer readable storage media, e.g. mass storage devices, disks, magnetic disks, optical disks, magnetic tape, flash memory, RAM, ROM, EEPROM, or any other media that can be used to carry or store computer-readable information. I/O devices 108 may also include a communication device for connecting computing system 100 with one or more other computing systems over a network, e.g. wired and/or wirelessly, utilizing one or more communications protocols, e.g. IEEE 802.11, IEEE 802.3, TCP/IP, cellular protocols, any other communications protocols, and combinations thereof computing system 100 or computing device 102 may each include one or more communication devices and applicable controller(s) for connecting such computing system 100 or computing device 102 with one or more other computing systems and/or computing devices, such that I/O devices 108 are integral with and are part of computing system 100 or computing device 102 and not a separate component therefrom, e.g. built-in cameras, microphones, speakers, network connection devices, and other built-in components.

Computing system 100 may include one or more I/O devices 108 of the same type or of different types and combinations thereof and one or more computing devices 102 of the same type or of different types and combinations thereof operably connected to each other.

The functions, methods, or algorithms described herein may be implemented in hardware, software, firmware, or any combinations thereof. When implemented in software, the described methods, processes, techniques may be stored in memory, computer-readable storage media, and/or combinations thereof and transmitted as one or more instructions or code to cause computing system 100 to operate in accordance with the teachings of the present disclosure. The operable connection of the various components of computing system 100 described in reference to FIG. 1 include buses, circuitry, wires, wireless, or other connections. The functions, methods, and techniques described herein may be implemented by one or more computing system in cooperation with each other. The components of computing system 100 shown and described, including their relationships and functions, are exemplary and are not to limit the implementation of the systems, methods, and techniques described herein.

Figure 2:
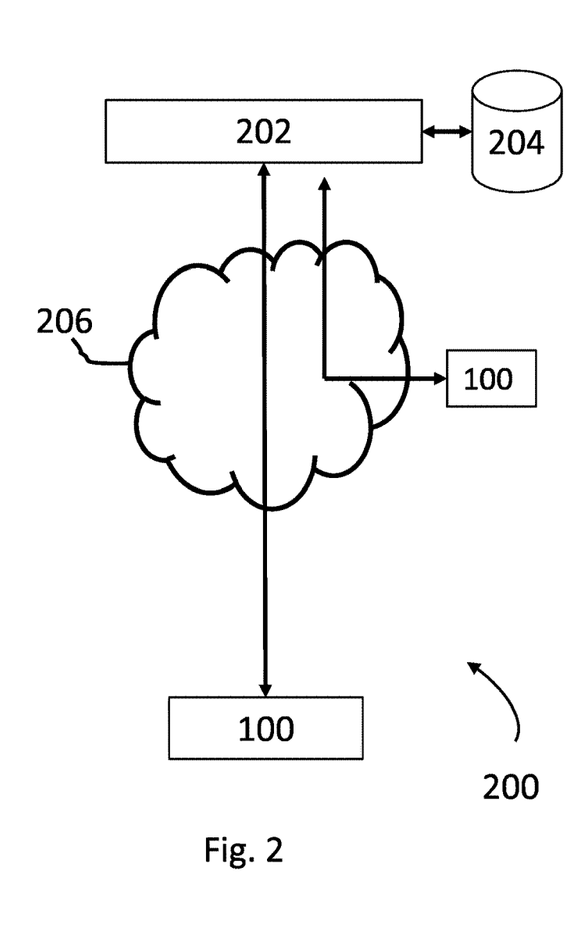
FIG. 2 depicts a pictorial representation of a network of computing systems that may be implemented in connection with the embodiments and features consistent with the present disclosure.

FIG. 2 illustrates a pictorial representation of an example system 200 illustrating a plurality of computing systems 100 operably connected together and through server 202 via network 206. Server 202 may operably be connected to database 204.

The systems, processes, techniques, and computer program products described in the present disclosure address the problems enterprises encounter relating to compatibility testing. Enterprises utilizing the solutions described herein are able to customize and select which patches to apply and install on their computer systems, manage the scheduling, compatibility testing, reporting, and updating of their computer systems. Such solutions provide users with the ability to customize testing times as a function of the number of applications and need time.

The systems, processes, techniques, and computer program products described in the present disclosure enable an enterprise to automate its compatibility testing process of images of the target computing systems in a safe and controlled digital environment before applying patches to the target computing systems. The systems, processes, techniques, and computer program products described in the present disclosure remove the need for manual testing thereby avoiding the expense of resources and significantly remove current compatibility testing times from weeks or months to hours and days.

The systems, processes, techniques, and computer program products described in the present disclosure eliminate the risk of failure by providing a real-time analysis of how a specific patch or all patches will impact the enterprise's images of its computer systems before such patches are actually installed and deployed on the target computing systems. As will be described herein, the automated path compatibility testing systems, processes, techniques, and computer program products described herein enable the automated testing of the functionality of a patched image of the target computing systems and obtain business intelligence performance data for purposes of assessing compatibility and compiling data over time to provide certain insights to the enterprise to enable the enterprise to make more informed and cost-effective business decisions, maximize utilization of its computing resources and infrastructure, and proactively plan for computer systems upgrades or purchases. For example, the performance trends will be identifiable to enable the enterprise to more accurately predict remaining useful life of its equipment, maximize or prolong the life of its equipment, keep its computer systems and infrastructure up-to-date with patch releases, and be able to achieve all the foregoing results with limited resources or not having to expend significant resources to achieve the same results.

An automated patch compatibility testing system can be installed on the target computing systems of the enterprise or accessible through the target computing systems to a remote server hosted elsewhere.

The automated patch compatibility testing system includes a hypervisor component, a patch management system component, and an automated testing system component.

As known in the art, a hypervisor is computer software, firmware or hardware that creates and runs virtual machines. A computer on which a hypervisor runs one or more virtual machines is called a host machine, and each virtual machine is called a guest machine. Utilizing a hypervisor for compatibility testing enables an enterprise to analyze how patches applied to the image will impact its computer systems, both hardware and software, and the performance thereof in a controlled environment before the patches are actually installed and deployed on the target computing systems.

In configuring the automated patch compatibility testing system for a given enterprise, a system administrator or vendor will configure the automated patch compatibility testing system to import or otherwise include an image for each target computing system. As known in the art, a computer image refers to the build or configurations of the computer systems. For example, a computer image refers to the combination of operating system, applications installed thereon, settings, configurations, personalization, and device drivers code. Images for each target computing system are stored in an image database. As is common in many enterprises, different departments such as accounting, engineering, human resources, informational technology, and research and development, may utilize different software applications and/or have different computing system configurations such that each department's computer systems may be configured differently and have different images from other departments that can be impacted differently by the same patches. Accordingly, the automated patch compatibility testing system may include different images for each of the different departments in the enterprise and compatibility testing is performed on enterprise-wide images as well as department-specific images.

The image database may include an image corresponding to the current active image in use or deployed by the enterprise and by specific departments. The image database may include a generic image representative of the most basic and common components and elements of all computer systems in the enterprise or within each department. The image database is also configurable to store past images for a duration of time as set by the enterprise.

The patch management system component includes software that can be configured to automatically detect and download and install new patches. As part of the automated patch compatibility testing system, an enterprise can determine its patching strategy and configure the patch management system component to automatically detect, download, and install new patches when made available by third-party patch suppliers, e.g. Microsoft and other software providers. The enterprise can configure the automated patch compatibility testing system with a set predefined schedule as to when to acquire patches from the third-party suppliers. Configuration of patch acquisition can also be done via grouping patches together by types, e.g. security patches, browser patches, application patches, and the like, and acquiring and testing each group of patches.

The automated patch compatibility testing system also includes an application testing system component. The application testing system component includes a list of all applications the enterprise desires to have the compatibility tests performed on to obtain performance data of the applications after the patches are applied to the computer image of the target computing system. The application list can be all of the enterprise's software applications or a subset thereof. As with having different images corresponding to different departments, the application list can also be tailored to test different applications within each department, i.e. departments have department-specific application lists. The application list(s) is stored in a database.

As part of the automated patch compatibility testing system, the application testing system component includes configurations and settings to enable automation via a macro recorder. The automated patch compatibility testing system also includes a video recorder to record the virtual desktop of the testing image of the target computing machine to enable the enterprise to review and watch the compatibility testing process.

Figure 3:
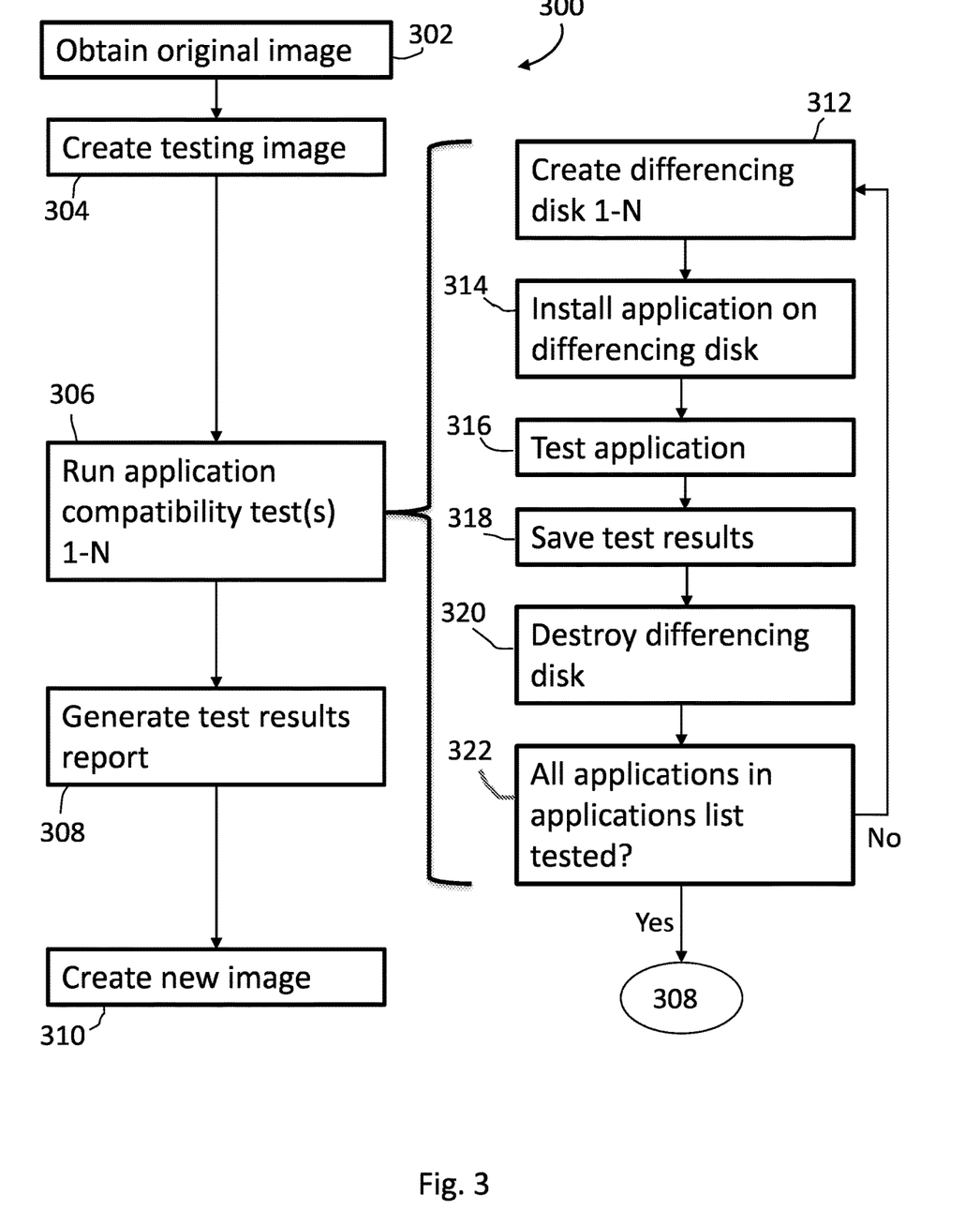
FIG. 3 is a logical flow diagram illustrating an automated patch compatibility testing process.

Referring to FIG. 3, an exemplary method 300 implemented by an automated patch compatibility testing system that includes a memory and a processor. Method 300 can be triggered automatically in response to detection, by the patch management system component that one or more patches are available. Method 300 may also be triggered automatically based on a predefined schedule configurable in the automated patch compatibility testing system. Method 300 may be recorded in its entirety or during the testing compatibility step, as will be described later.

At block 302, an original image is obtained and staged in the hypervisor. The original image can correspond to a current or the most recent active deployed image of the target computing system. The original image can correspond to a generic image of the target computing system, where the generic image is the most recent image version representative of the image that is actively deployed on the target computing system. The original image is obtained from the database of images. At block 304, a testing image is created of the target computing system from the original image. Creating the testing image includes installing one or more patches on the original image and thereby create the testing image. One or more testing images may be created. For example, if the enterprise configured the automated patch compatibility testing system to group patches by patch type, each testing image will be patched with one of the patch groups. Enterprises may configure the automated patch compatibility testing system to apply all patches to create a single testing image.

Depending upon the enterprise's compatibility testing strategy and goals, the automated patch compatibility testing system is configurable to apply and test patches to the operating system of the image, or to apply and test patches to the operating system and some core applications of the image. The core applications may be defined by the enterprise, e.g. such as Microsoft Office or Adobe Acrobat, or the like.

The testing image is rebooted, e.g. the virtual machine representative of the target computing system having the testing image thereon is rebooted. If the compatibility tests will be performed in a different environment than the environment in which the testing image was created, e.g. a different hypervisor than the environment in which the testing image was created, the testing image is imported to such testing area. To the extent the recording of the virtual desktop of the testing image has not started recording, such recording is started.

At 306, for each application in an application list associated with the target computing system, compatibility testing of the one or more patches with an application is performed on the testing image. The compatibility testing includes, at 312, creating a differencing disk on the testing image. Differencing disks and the creation thereof are known in the art and will not be discussed in depth. As known in the art, a differencing disk may be a fixed disk or a dynamically expanding disk, and is a type of virtual hard disk that stores and manages changes made to another virtual hard disk or its parent virtual hard disk and is generally used to track, store, manage, and restore the changes or modifications applied on a virtual hard disk. The differencing disk is a sub-disk that is typically smaller in size compared to its root parent. For purposes of the compatibility testing of the present disclosure, the use of the differencing disk enables the testing image that is the parent disk to remain intact and in a pristine condition as each application is separately tested on its own differencing disk. At 314, an application from the application list is installed on the created differencing disk. At 316, the automated patch compatibility testing system conducts a performance functionality test of the installed application to obtain performance data. The performance functionality test includes launching the application, monitoring the application for a period of time to identify the type and amount of computer resources its uses, and closing the application. Such actions, such as launching the application can be achieved via a macro recorder or similar functionality contained within the automated patch compatibility testing system. Performance data includes average central processing unit (CPU) usage, average random access memory (RAM) usage, average disk usage, average graphics processing unit (GPU) usage, average network usage, and elapsed time of the performance functionality test of the application that is being tested. At 318, the results of the performance functionality test are saved to a database associated with the target computing system. At 320, the application is uninstalled and the differencing disk is destroyed. The destruction of the differencing disk mitigates against an installed application interfering with other, including subsequent, performance functionality tests of different installed applications on their own respective differencing disks on the testing image.

Not depicted in FIG. 3, prior to saving the performance functionality test results, uninstalling the application from the differencing disk is part of the performance functionality test and the results of whether or not the application could be uninstalled from the differencing disk are saved to the database associated with the target computing system.

The compatibility tests of 306 are repeated for each application in the application list as described above. Upon completion of compatibility testing of all applications in the application list, at 308, a test results report is generated. The test results report provides an indication of compatibility of each tested application with the testing image. The indication of compatibility is determined by whether the performance data meets compatibility thresholds. Compatibility thresholds are predefined and configurable in the automated patch compatibility testing system by, for example, a system administrator of the target computing system of the enterprise. The test results report may also include a comparison of performance data from one or more past tests to the results from the compatibility testing step of the current test to provide an indication of changes in performance of the target computing system, including hardware thereof, before and after installation of patches on the original image. The comparison of performance data is indicative of changes in the performance of the target computing system. As previously described, the enterprise may review such comparisons of performance data to identify changes or trends in the target computing systems' operations, including take proactive measures to determine future computing resource needs, mitigation steps or other steps to extend the useful life of the target computing systems. The comparison of performance data may be done by comparing the current test results with the immediately preceding compatibility test results, or may be done by comparing the current test results with one or more past prior compatibility test results to provide the enterprise with performance data of how the target computing system has been impacted by the installation of patches over a period of time. For example, such reports and comparison of past and present performance data can enable the enterprise to see a degradation in the functioning of the hardware of its computing systems and the test result reports and comparisons may show a decline in the performance data over time spanning over two or more compatibility testing cycles.

At 310, a new image, based on the compatibility testing results is created and saved to the database. The new image creation may occur upon approval by a system administrator of the target computing system. The new image corresponds to and includes those patches that passed the compatibility testing. The new image creation may occur automatically by the automated patch compatibility testing system in response to the indications of compatibility based on the functionality performance test results from the compatibility testing step. For example, an enterprise can configure the automated patch compatibility testing system to automatically create the new image if the compatibility test results satisfy predefined criteria the enterprise sets in the system. The enterprise can also set thresholds or criteria as to what is considered "compatible" or passage of the compatibility test, e.g. what it deems as acceptable functionality performance data for the applicable target computing system. Assuming the enterprise deploys the new image, the new image will be stored in the database and will serve as the original image in the next cycle of compatibility tests.

For example, if an enterprise tests compatibility on a monthly basis, in the event an enterprise does not install or deploy any patches after a cycle of compatibility testing, a good practice for the enterprise is to store in the image database the current active image in use for that particular cycle so that the enterprise will have a history that compatibility testing was not skipped for that particular month/cycle.

For each application that failed during its compatibility test, the enterprise initiates a remediation process. The issue causing the failure is determined. If the failure is the result of a bad patch, then the patch is removed from the patch management system component. A "bad patch" is something that causes one or more of the performance data to not satisfy the configurable predefined criteria in the automated patch compatibility testing system, or causes an application to fail the test before the performance data can be recorded or obtained, or causes system issues before testing can commence, e.g. a blue screen. If the failure is the result of a package issue, e.g., various errors occurred during launch or use of the application, then a repackaging process is conducted to remedy the failure, e.g. uninstalling and reinstalling the application. All failures are also noted and logged. Any patches that are not deployed or installed in the new image are logged and stored in the database so there is a historical record of what occurred. After failures are remediated, the enterprise may configure the automated patch compatibility testing system to run a special test for those repackaged applications, rerun the full compatibility testing process, or wait until the next patch compatibility testing cycle.

Example 1

The following tables illustrate a comparison of using the presently disclosed systems, methods, computer program products, and techniques and benefits thereof compared to compatibility testing via manual compatibility testing processes. The example below is a cost of compliance of an enterprise that has a workforce of 1,500 employees and 200 applications installed on the enterprise's computer systems.

The following assumptions were used as part of the analysis for this example 1: (i) each application test takes thirty minutes to verify performance and capture performance data of the tested application; (ii) an employee annual cost of $170,000; (iii) the annual cost to the enterprise for certain executives and other key personnel are a vice president at $750,000, director at $500,000, senior manager at $350,000, technical team at $200,000, and core team at $170,000; (iv) a single enterprise and vendor resource minimum; (v) 2% call volume from the enterprise in during the outage; (vi) a user or workforce productivity based on $170,000 annual rate, helpdesk calls lasting 25 minutes, and 60 minutes impact for deskside; and that a senior technical team includes at least two individuals from the enterprise, one individual from vendor, and one information-security personnel.

TABLE 1

Cost of Compliance

| | |
|---|---|
| Total Applications | 200 |
| Time to test (hours) | 0.5 |
| Cost per hour | $81.73 |
| Compliance today % | 25% |
| Compliance goal % | 100% |
| Cost of today | $2,043.27 |
| Cost of goal | $8,173.08 |

As shown in Table 1, the exemplary enterprise currently achieves 25% compliance in keeping its computer systems current with available patches. The cost to the enterprise to manually compatibility test patches at the 25$^{th}$ percentile, e.g. 50 applications, is $2,043.27 and is approximately 25 hours of effort. In order for the enterprise to obtain compatibility testing of all applications, the cost is approximately $8,173.08 and takes about 100 hours of effort. The calculations of Table 1 do not include the time or costs related to project management and reporting.

Tables 2 and 3 illustrate the cost to the exemplary enterprise following an outage as a result of a bad patch.

TABLE 2

Cost to remediate post-patch

| | |
|---|---|
| Duration of outage | 1 Week |
| Cost of executive calls | $7,091.35 |
| Cost of technical team calls | $28,605.77 |
| Helpdesk costs | $1,500.00 |
| Field service dispatch | $2,700.00 |
| Business productivity impact | $5,001.92 |
| Cost of Bad Update | $44,899.04 |

TABLE 3

Bad patch cost - remediation costs

| Event Duration (Business Days) | 5 | Hourly Cost | Quantity per outage | Total cost per hour |
|---|---|---|---|---|
| VP Cost | $750,000.00 | $360.58 | 1 | $360.58 |
| Director Cost | $500,000.00 | $240.38 | 1 | $240.38 |
| Sr Manager Cost/Sr Vendor | $350,000.00 | $168.27 | 2 | $336.54 |
| Sr Technical Team/Vendor | $250,000.00 | $120.19 | 4 | $480.77 |
| Technical Team | $170,000.00 | $81.73 | 4 | $326.92 |
| Daily Tech Meetings (Hours) | 5.00 | | | |
| Daily Exec Calls (Hours) | 1.00 | | | |
| Helpdesk Calls | 75.00 | | | |
| Helpdesk Cost | $20.00 | | | |
| Helpdesk % Users Call In | 5% | | | |
| End Users | 1500 | | | |
| Field Service Dispatches | 30 | | | |
| Field Service Impact | 2% | | | |
| Field Service Cost | $90.00 | | | |

The automated patch compatibility testing system, method, and computer program product enable an entity to check the functionality of applications following patches applied to the original image so that the enterprise can determine how its target computing systems will react to such patches before those patches are actually installed/deployed to the target computing systems. The automated compatibility testing system, method, and computer program product disclosed herein helps enterprises ensure that patches do not adversely impact the target computing systems and the operations thereof, and enable the enterprise to operate with minimal disruptions, stay current with patches, and take proactive and informed business decisions in managing the enterprise's computer infrastructure.

To the extent various third-party software and components are referenced in the present disclosure, such is exemplary and for ease of discussion and readability. The present systems, methods, and computer program products are not limited to such components or software applications and components and applications capable of performing similar functions to those described herein to achieve the results described herein are likewise suitable.

The use of ordinal number terminology (i.e., "first," "second," "third," "fourth," etc.) is for the purpose of differentiating between two or more items and is not meant to imply any sequence or order or importance to one item over another or any order of addition. The term "or combinations thereof" as used herein refers to all permutations and combinations of the listed items preceding the term. The skilled artisan will understand that typically there is no limit on the number of items or terms in any combination, unless otherwise apparent from the context.

Although certain steps are described herein and illustrated in the figures as occurring sequentially, some steps may occur simultaneously with each other or in an order that is not depicted. While various implementations have been described herein, such descriptions are presented by way of example and are not to be limited to the precise descriptions and illustrations. Accordingly, numerous modifications and variations are possible by those skilled in the art without departing from the spirit and scope hereof, as defined by the following and later-submitted claims and their equivalents. The breadth and scope of the present disclosure should not be limited by any of the implementations and illustrations described herein, but should be defined only in accordance with the following and later-submitted claims and their equivalents.

What is claimed is:

1. A method implemented by an automated patch compatibility testing system that includes a memory and a processor, the method comprising:
   creating, in a hypervisor, a testing image of a target computing system from an original image, wherein the step of creating a testing image from an original image includes installing one or more patches on the original image and thereby create the testing image;
   for each application in an application list, testing compatibility of the one or more patches with an application on the testing image, wherein the testing compatibility step includes:
      creating a differencing disk on the testing image, wherein the differencing disk is a sub-disk of the testing image and the testing image is a parent disk of the differencing disk,
      installing one application from the application list on the differencing disk,
      conducting a performance functionality test of the installed application to obtain performance data,
      storing the performance data in a database associated with the target computing system,
      upon completion of the performance functionality test, destroying the differencing disk, wherein destruction of the differencing disk mitigates against the installed application interfering with subsequent performance functionality tests of different installed applications on the testing image;
   upon completion of the testing compatibility step for all applications in the application list, generating a test results report, wherein the test results report provides an indication of compatibility of each tested application with the testing image, wherein the indication of compatibility is determined by whether the performance data meets compatibility thresholds, wherein compatibility thresholds are predefined and configurable in the automated patch compatibility testing system, wherein the test results report includes a comparison of performance data from one or more prior compatibility test results to current results from the compatibility test step and provide an indication of changes in performance of the target computing system before and after installation of patches on the original image.

2. The method of claim 1, wherein the original image corresponds to a target computing system and the original image includes an operating system associated with the target computing system and the original image is stored in the database associated with the target computing system that includes one or more images of the target computing system.

3. The method of claim 1, wherein the one or more patches are grouped by patch type to create one or more groupings and each grouping of patch type is installed on the original image to thereby create one or more testing images with each testing image corresponding to each grouping of patch types.

4. The method of claim 1, wherein the step of creating a testing image occurs automatically in response to detection, by a patch management system of the automated patch compatibility testing system, of one or more patches made available.

5. The method of claim 1, wherein the step of creating a testing image occurs automatically based on a predefined schedule configurable in the automated patch compatibility testing system.

6. The method of claim 1, wherein the application list corresponds to applications installed on the target computing system to be tested for compatibility with patches applied to the testing image of the target computing system.

7. The method of claim 1, wherein performance data for each performance functionality test of each application includes: average CPU usage, average RAM usage, average disk usage, average GPU usage, average network usage, and elapsed time of the performance functionality test of the application.

8. The method of claim 7, wherein the performance functionality test includes launching the installed application and monitoring performance of the launched application on the differencing disk to obtain the performance data.

9. The method of claim 1, wherein prior to destroying the differencing disk in the testing compatibility step, uninstalling the installed application from the differencing disk.

10. The method of claim 1 further comprising the step of:
video screen recording a virtual desktop of the testing image prior to and throughout the testing compatibility step.

11. The method of claim 1 further comprising the steps of:
creating a new image of the target computing system based on the results of the functionality performance test of the testing image and storing the new image in the database.

12. The method of claim 11, wherein the step of creating a new image occurs upon approval by a system administrator of the target computing system.

13. The method of claim 11, wherein the step of creating a new image occurs automatically by the automated patch compatibility testing system in response to the indication of compatibility based on the functionality performance test results.

14. An automated patch compatibility testing system comprising:
one or more processors;
one or more memories coupled to at least one of the processors; and
a set of computer program instructions stored in at least one of the memories and executable by at least one of the processors to cause the automated patch compatibility testing system to perform actions of:
creating, in a hypervisor, a testing image of a target computing system from an original image, wherein the one or more patches are installed on the original image to create the testing image;
for each application in an application list, testing compatibility of the one or more patches with an application on the testing image, wherein the application list corresponds to applications installed on the target computing system to be tested for compatibility with patches applied to the testing image of the target computing system and wherein testing compatibility includes:
creating a differencing disk on the testing image, wherein the differencing disk is a sub-disk of the testing image and the testing image is a parent disk of the differencing disk,
installing one application from the application list on the differencing disk,
conducting a performance functionality test of the installed application to obtain performance data,
storing the performance data in a database associated with the target computing system,
upon completion of the performance functionality test, destroying the differencing disk, wherein destruction of the differencing disk mitigates against the installed application interfering with subsequent performance functionality tests of different installed applications on the testing image; and
upon completion of testing compatibility for all applications in the application list, generating a test results report, wherein the test results report provides an indication of compatibility of each tested application with the testing image, wherein the indication of compatibility is determined by whether the performance data meets compatibility thresholds, wherein compatibility thresholds are predefined and configurable in the automated patch compatibility testing system, wherein the test results report includes a comparison of performance data from one or more prior compatibility test results to current results from the compatibility test step and provide an indication of changes in performance of the target computing system before and after installation of patches on the original image.

15. The system of claim 14, wherein the original image corresponds to a target computing system and the original image includes an operating system associated with the target computing system and the original image is stored in the database associated with the target computing system that includes one or more images of the target computing system.

16. The system of claim 14, wherein the action of creating a testing image occurs automatically in response to detection, by a patch management system of the automated patch compatibility testing system, of one or more patches made available.

17. The system of claim 14, wherein the action of creating a testing image occurs automatically based on a predefined schedule configurable in the automated patch compatibility testing system.

18. The system of claim 14, wherein performance data for each performance functionality test of each application includes: average CPU usage, average RAM usage, average disk usage, average GPU usage, average network usage, and elapsed time of the performance functionality test of the application.

19. The system of claim 14, wherein the set of computer program instructions stored in at least one of the memories and executable by at least one of the processors further cause the automated patch compatibility testing system to perform actions of creating a new image of the target computing system based on the results of the functionality performance test of the testing image and storing the new image in the database.

20. The system of claim 19, wherein the new image is created automatically by the automated patch compatibility testing system in response to the indication of compatibility based on the functionality performance test results.

21. A computer program product stored in a non-transitory computer readable storage medium, comprising program code that, when executed by an automated patch compatibility testing system, causes the automated patch compatibility testing system to perform actions comprising:

creating, in a hypervisor, a testing image of a target computing system from an original image, wherein the one or more patches are installed on the original image to create the testing image;

for each application in an application list, testing compatibility of the one or more patches with an application on the testing image, wherein the application list corresponds to applications installed on the target computing system to be tested for compatibility with patches applied to the testing image of the target computing system and wherein testing compatibility includes:

creating a differencing disk on the testing image, wherein the differencing disk is a sub-disk of the testing image and the testing image is a parent disk of the differencing disk, installing one application from the application list on the differencing disk, conducting a performance functionality test of the installed application to obtain performance data, storing the performance data in a database associated with the target computing system, upon completion of the performance functionality test, destroying the differencing disk, wherein destruction of the differencing disk mitigates against the installed application interfering with subsequent performance functionality tests of different installed applications on the testing image; and upon completion of testing compatibility for all applications in the application list, generating a test results report, wherein the test results report provides an indication of compatibility of each tested application with the testing image, wherein the indication of compatibility is determined by whether the performance data meets compatibility thresholds, wherein compatibility thresholds are predefined and configurable in the automated patch compatibility testing system, wherein the test results report includes a comparison of performance data from one or more prior compatibility test results to current results from the compatibility test step and provide an indication of changes in performance of the target computing system before and after installation of patches on the original image.

22. The computer program product of claim 21, wherein the original image corresponds to a target computing system and the original image includes an operating system associated with the target computing system and the original image is stored in the database associated with the target computing system that includes one or more images of the target computing system.

23. The computer program product of claim 21, wherein the action of creating a testing image occurs automatically in response to detection, by a patch management system of the automated patch compatibility testing system, of one or more patches made available.

24. The computer program product of claim 21, wherein the action of creating a testing image occurs automatically based on a predefined schedule configurable in the automated patch compatibility testing system.

25. The computer program product of claim 21, wherein performance data for each performance functionality test of each application includes: average CPU usage, average RAM usage, average disk usage, average GPU usage, average network usage, and elapsed time of the performance functionality test of the application.

26. The computer program product of claim 21, wherein the computer program further cause the automated patch compatibility testing system to perform actions of creating a new image of the target computing system based on the results of the functionality performance test of the testing image and storing the new image in the database.

27. The computer program product of claim 26, wherein the new image is created automatically by the automated patch compatibility testing system in response to the indication of compatibility based on the functionality performance test results.

* * * * *